United States Patent Office 3,784,578
Patented Jan. 8, 1974

3,784,578
PROCESS FOR THE PRODUCTION OF ALLYL ESTERS
Wolfgang Swodenk, Odenthal-Globusch, and Gerhard Scharfe and Johann Grolig, Leverkusen, all % Farbenfabriken Bayer AG, Leverkusen, Germany
No Drawing. Filed June 26, 1970, Ser. No. 50,342
Int. Cl. C07c 67/02
U.S. Cl. 260—410.9 N                                14 Claims

ABSTRACT OF THE DISCLOSURE

Allyl esters of carboxylic acids are prepared in high purity and yield in short reaction times by reacting allyl acetate with the methyl or ethyl ester of the carboxylic acid in the contacting presence of a Group I, II or III metal alkoxide.

---

This invention relates to a particularly economical process for the production of high-purity allyl esters by reacting allyl acetate with methyl or ethyl esters of carboxylic acids.

Allyl esters are compounds which can be polymerized or copolymerized. In many cases where these esters are used for chemical purposes, very stringent demands are made in regard to their purity and absence of discoloration. The allyl esters are required to be free of decomposition products, polymers, acidic or alkaline constituents and metal compounds; they are also required to be colorless and to show a high resistance both to thermal stress and to light.

Allyl esters can be obtained by a variety of methods. For example, allyl alcohol can be reacted with a carboxylic acid using an acid esterification catalyst such as sulfuric acid or toluene sulfonic acid, to form the allyl esters. In cases such as these, the catalyst has to be destroyed by neutralization on completion of the reaction, and the allyl ester suitably isolated in the pure form.

It has now been found that highly pure allyl esters of carboxylic acids, free of metal compounds and discoloring constituents can be obtained particularly economically by the instant invention.

Essentially, the invention comprises reacting allyl acetate with the methyl or ethyl ester of such carboxylic acid in the contacting presence of a catalyst comprising an alkoxide of a metal of the first to the third main group of the Periodic System or a mixture or a complex salt thereof.

The allyl ester obtained on completion of the reaction, by distillation for example, is free from metal compounds and discoloring constituents. The reaction velocities are high enough to make the process commercially advantageous. Low catalyst concentrations are required. The catalysts can be reused for further reactions and the costs they involve are low.

Conversion of the methyl or ethyl esters into the allyl ester can be made substantially complete by carrying out the reaction with an excess of allyl acetate, removing the methyl or ethyl acetate formed during the reaction from the equilibrium by distillation and separating the excess of allyl acetate by distillation. Allyl esters which are colorless and free of metal compounds are obtained following redistillation of the sump product left.

It is possible in this way to prepare allyl esters of a variety of carboxylic acids such as for example:

(1) The allyl esters of saturated aliphatic and cycloaliphatic carboxylic acids, such as propionic acid, butyric acid, isobutyric acid, valeric acid, isovaleric acid, pivalic acid, caproic acid, 2-methyl valeric acid, isocaproic acid, diethyl acetic acid, dimethylethyl acetic acid, tert.-butyl acetic acid, methyl isopropyl acetic acid, oenanthic acid, isopentyl acetic acid, caprylic acid, ethylbutyl acetic acid, pelargonic acid, capric acid, undecylic acid, lauric acid, tridecylic acid, myristic acid, pentadecylic acid, palmitic acid, margaric acid, stearic acid, oxalic acid, malonic acid, succinic acid, glutaric acid, methyl succinic acid, ethyl malonic acid, dimethyl malonic acid, adipic acid, pimelic acid, suberic acid, azelaic acid, sebacic acid, undecane dicarboxylic acid, dodecane dicarboxylic acid, hexahydrobenzoic acid, cyclohexane dicarboxylic acid, endomethylene cyclohexane dicarboxylic acid etc.

(2) Allyl esters of substituted aliphatic, cycloaliphatic and araliphatic mono and polycarboxylic acids whose substituents, for example halogen, can be the ether and thioether group or aryl radicals, for example phenyl radicals, such as: chloroacetic acid, dichloroacetic acid, trichloroacetic acid, bromo acetic acid, 2-chloropropionic acid, 3-chloropropionic acid, 2-chlorobutyric acid, 6-chlorocaproic acid, 6-bromocaproic acid, $\alpha$-chlorocyclohexane carboxylic acid, methoxy acetic acid, ethoxy acetic acid, diglyolic acid, thiodiglyolic acid, phenyl acetic acid, diphenyl acetic acid, etc.

(3) Allyl esters of unsaturated aliphatic, cycloaliphatic or araliphatic mono and polycarboxylic acids such as acrylic acid, methacrylic acid, crotonic acid, vinyl acetic acid, oleic acid, linolic acid, sorbic acid, tetrahydrobenzoic acid, cinnamic acid, maleic acid, fumaric acid, methylene succinic acid, endomethylene cyclohexene dicarboxylic acid, tetrahydrophthalic acid, etc.

(4) Allyl esters of aromatic mono and polycarboxylic acids such as benzoic acid, o-tolylic acid, p-tolylic acid, m-tolylic acid, 4-tert.-butylbenzoic acid, $\alpha$-naphthalene carboxylic acid, $\beta$-naphthalene carboxylic acid, phthalic acid, isophthalic acid, terephthalic acid, etc.

(5) Allyl esters of carbonic acid.

The catalysts used in accordance with the invention can be obtained in different ways, for example they can be prepared as described by Meerwein and Bersin in Annalen 476, pages 113–150, by dissolving metals of the 1st to 3rd main group of the Periodic System in the corresponding alcohols, for example methanol or ethanol, for which purpose the metals may optionally be activated with a mercury salt or with iodine. However, they can also be obtained by transesterifying an alkoxide of a relatively low boiling alcohol with a relatively high boiling alcohol, the relatively low boiling alcohol being distilled off. This procedure is particularly suitable for the production of metal allylates from the corresponding methyl methylates. Complex alcoholates can be obtained by dissolving the corresponding metals in alcohol in a stoichiometric ratio or simply by combining stoichiometric quantities of two simple alcoholates.

The following catalysts are mentioned by way of example: alcoholates containing up to, e.g., 4, carbon atoms in each alcoholate moiety, e.g., lithium methylate, sodium methylate, potassium methyalte, magnesium methylate, magnesium ethyalte, magnesium allylate, calcium methylate, aluminum methylate, lithium magnesium methylate, lithium calcium methylate, lithium boromethylate, lithium aluminum methylate, sodium magnesium methylate, sodium calcium methylate, sodium boromethylate, sodium aluminum methylate, potassium magnesium methylate, potassium calcium methylate, potassium boromethylate, potassium aluminum methylate, calcium boromethylate, calcium aluminum methylate, magnesium aluminum methylate, etc.

The catalysts are dissolved or suspended in the ester mixture in a quantity of from 0.1 to 10% by weight, based on the organic starting material, i.e., allyl acetate and carboxylic acid ester. On completion of the reaction, the catalysts may be mechanically separated off providing they are insoluble at room temperature and reused for another reaction, or alternatively they may be recovered as a sump product following redistillation of the allyl ester and recycled as such to the continuing reaction. In some cases, there is no need at all to recover the inexpensive catalyst.

The quantitative ratios between the organic components can be varied within wide limits. However, it is of advantage to use the allyl acetate in a molar excess in order to quantitatively react the alkyl ester of the carboxylic acid whose allyl ester is to be prepared. This procedure is particularly important in the case of polycarboxylic acids in order to ensure transesterification of all the carboxylic ester groups. However, if for example only one of the ester groups is to be substituted by the allyl radical, it can be of advantage to use less than the stoichiometric amount of the allyl acetate which would be required for complete transesterification.

Transesterification may be carried out either continuously or in batches. Batch transesterification is best carried out by introducing the ester components and the catalyst into a reaction vessel and heating the reaction mixture while stirring to the reflux temperature. Ethyl acetate or methyl acetate is continuously distilled off through a column attached to the reaction vessel at a rate proportional to the progress of the reaction until all the methyl or ethyl ester used has been completely reacted. After the unreacted excess allyl acetate has been distilled off, the allyl ester thus obtained is separated off by straightforward redistillation, optionally after any undissolved catalyst components have been separated beforehand. The catalyst left as the filter residue or in sump product of distillation is reused for another transesterification batch.

Where transesterification is carried out continuously the reaction can be carried out in a cascade of vessels or in a distillation column, in the latter case the catalyst-containing ester mixture is continuously introduced at a suitable point along the column so that the methyl or ethyl acetate formed is continuously distilled off at the head of the column, while the allyl ester formed, the excess allyl acetate and catalyst are run off at the bottom end of the column. Separation of the allyl acetate, redistillation of the allyl ester formed and separation of the catalysts can also be carried out continuously in further columns.

EXAMPLES

General conditions and test procedure:

A 500 ml. capacity three-necked flask equipped with a stirring mechanism, thermometer and a heated Vigreux column (30 cm. long, 2 cm. internal diameter) was used as the reaction vessel. 1.5 moles of allyl acetate and 0.5 mole of the methyl or ethyl ester of a monocarboxylic acid or 0.25 mole of the methyl or ethyl ester of a dicarboxylic acid, were introduced into the reaction vessel. Accordingly, the equivalent ratio of allyl acetate to mono or dicarboxylic acid ester was always 3:1. The catalyst was added to the ester mixture in such quantities that the concentrations specified in the table (percent by weight) were obtained.

The contents of the flask were then brought to the boil. When the boiling point of methyl acetate (57° C.) or ethyl acetate (77° C.) had been reached at the head of the column, the distillate was removed in such a quantity that a head temperature of 65° C. in the case of methyl esters were obtained in the pure form by straightforward exceeded. In order to complete the reaction, distillation was continued up to the boiling point of allyl acetate (104° C.). The reaction time quoted in the examples is the time taken to reach the boiling point of allyl acetate from the beginning of the distillation.

The distillate and the sump product were analyzed by gas chromatography, and the yields of allyl ester, based on alkyl ester used, determined from the results. After the excess alkyl acetate had been distilled off, the allyl esters were obtained in the pure form of straightforward distillation, optionally in vacuo. The distilled esters were examined for their metal content (results set out in the table):

TABLE 1.—REACTION OF ALKYL ESTERS WITH ALLYL ACETATE IN THE PRESENCE OF THE CATALYST ACCORDING TO THE INVENTION

| Example No. | Alkyl ester | Catalyst | Catalyst percent by weight in the ester mixture | Reaction time (hours) | Allyl ester yield in mol percent | Allyl ester color | Distillate metal content, p.p.m. |
|---|---|---|---|---|---|---|---|
| 1 | Methyl propionate | $NaOCH_3$ | 2.5 | 2 | 91 | Colorless | <1 |
| 2 | do | $Li_2Mg(OCH_3)_4$ | 2.5 | 5 | 95 | do | <1 |
| 3 | do | $Li_2Mg(OCH_3)_4$ | 1.5 | 4 | 88 | do | <1 |
| 4 | do | $Li_2Ca(OCH_3)_4$ | 2.5 | 5 | 94 | do | <1 |
| 5 | do | $LiAl(OCH_3)_4$ | 2.5 | 4 | 91 | do | <1 |
| 6 | do | $Na_2Ca(OCH_3)_4$ | 2.5 | 4 | 97 | do | <1 |
| 7 | do | $Mg[B(OCH_3)_4]_2$ | 2.5 | 5.5 | 98 | do | <1 |
| 8 | Stearic acid methyl ester | $Li_2Mg(OCH_3)_4$ | 2.5 | 4 | 93 | do | <1 |
| 9 | Hexahydrobenzoic acid methyl ester | $Li_2Mg(OCH_3)_4$ | 2.5 | 3 | 93 | do | <1 |
| 10 | Adipic acid dimethyl ester | $Li_2Mg(OCH_3)_4$ | 2.5 | 18 | 80 | do | <1 |
| 11 | Chloroacetic acid ethyl ester | $Mg(OCH_3)_2$ | 2.5 | 6 | 87 | do | <1 |
| 12 | Dichloroacetic acid methyl ester | $Mg(OCH_3)_2$ | 2.2 | 4.5 | 88 | do | <1 |
| 13 | do | $Li(OCH_3)$ | 2.2 | 0.5 | 96 | do | <1 |
| 14 | do | $LiAl(OCH_3)_4$ | 2.2 | 3 | 87 | do | <1 |
| 15 | do | $NaAl(OCH_3)_4$ | 2.2 | 4.5 | 89 | do | <1 |
| 16 | do | $Al(OCH_3)_3$ | 2.2 | 5 | 84 | do | <1 |
| 17 | do | $Na_2Mg(OCH_3)_4$ | 2.2 | 2 | 82 | do | <1 |
| 18 | do | $Li_2Mg(OCH_3)_4$ | 2.2 | 1 | 81 | do | <1 |
| 19 | Ethoxyacetic acid methyl ester | $Mg(OCH_3)_2$ | 2.5 | 8.5 | 91 | do | <1 |
| 20 | Diglycolic acid dimethyl ester | $Mg(OCH_3)_2$ | 2.2 | 2 | 83 | do | <1 |
| 21 | Phenyl acetic acid methyl ester | $Mg(OCH_3)_2$ | 2.5 | 2.5 | 97 | do | <1 |
| 22 | Methyl acrylate | $Mg(OCH_3)_2$ | 2.5 | 6 | 89 | do | <1 |
| 23 | do | $Mg(OCH_3)_2$ | 2.5 | 2 | 97 | do | <1 |
| 24 | do | $Mg(OCH_3)_2$ | 1.0 | 2.5 | 95 | do | <1 |
| 25 | do | $Mg(OCH_3)_2$ ᵃ | 2.5 | 2 | 94 | do | <1 |
| 26 | do | $LiOCH_3$ | 2.5 | 1 | 87 | do | <1 |
| 27 | do | $Mg(OCH_2CH=CH_2)_2$ | 2.5 | 1.5 | 98 | do | <1 |
| 28 | do | $Ca(OCH_3)_2$ | 2.5 | 9 | 95 | do | <1 |
| 29 | do | $Li_2Ca(OCH_3)_4$ | 2.5 | 0.5 | 99 | do | <1 |
| 30 | do | $K_2Mg(OCH_3)_4$ | 2.5 | 2 | 91 | do | <1 |
| 31 | do | $Mg[Al(OCH_3)_4]_2$ | 2.5 | 0.5 | 86 | do | <1 |
| 32 | Methylmethacrylate | $Ca[B(OCH_3)_4]_2$ | 2.5 | 4 | 94 | do | <1 |
| 33 | Cinnamic acid | $Mg(OCH_3)_2$ | 2.5 | 11 | 95 | do | <1 |
| 34 | Sorbic acid | $Mg(OCH_3)_2$ | 2.5 | 4.5 | 94 | do | <1 |
| 35 | Maleic acid dimethyl ester | $Mg(OCH_3)_2$ | 2.5 | 1.5 | 87 | do | <1 |
| 36 | Methyl benzoate | $LiMg(OCH_3)_4$ | 2.5 | 2.5 | 91 | do | <1 |

See footnotes at end of table.

TABLE 1.—REACTION OF ALKYL ESTERS WITH ALLYL ACETATE IN THE PRESENCE OF THE CATALYST ACCORDING TO THE INVENTION—Continued

| Example No. | Alkyl ester | Catalyst | Catalyst percent by weight in the ester mixture | Reaction time (hours) | Allyl ester yield in mol percent | Allyl ester color | Distillate meta content p.p.m. |
|---|---|---|---|---|---|---|---|
| 37 | Dimethyl phthalate | KOCH$_3$ | 2.5 | 2 | 96 | do | <1 |
| 38 | do | Mg(OCH$_3$)$_2$ | 2.5 | 3.5 | 98 | do | <1 |
| 39 | do | Li$_2$Mg(OCH$_3$)$_4$ | 2.5 | 4 | 95 | do | <1 |
| 40 | do | Li$_2$Mg(OCH$_3$)$_4$ | 0.5 | 4 | 89 | do | <1 |
| 41 | do | Na$_2$Mg(OCH$_3$)$_4$ | 2.5 | 2.5 | 91 | do | <1 |
| 42 | do | Ca[B(OCH$_3$)$_4$]$_2$ | 2.5 | 2.5 | 99 | do | <1 |
| 43 | do | Ca[Al(OCH$_3$)$_4$]$_2$ | 2.5 | 3 | 99 | do | <1 |
| 44 | Dimethyl terephthalate | Li$_2$Mg(OCH$_3$)$_4$ | 2.5 | 4.5 | 83 | do | <1 | a Recovered from Example 36.

Example 45 alkyl ester: carbonic acid diethyl ester
molar ratio: allyl acetate: carbonic acid ester=3:1
catalyst: 2.5% by weight of Mg(OCH$_3$)$_2$
reaction time: 9 hours
yield of carbonic acid diallyl ester (based on carbonic acid ester used): 89 mole percent.

Pure colorless diallyl ester of B.P. 87° C. at 40 mm. Hg which was free from metal traces was obtained after distillation.

What is claimed is:

1. Process for the production of the allyl ester of a carboxylic or carbonic acid, which comprises reacting allyl acetate with the methyl or ethyl ester of said carboxylic or carbonic acid in the presence of a catalyst comprising an alkoxide of a metal of Group I or Group III of the Periodic System or mixtures or complex salts of such alkoxides.

2. Process as claimed in claim 1 wherein said catalyst is an alkoxide of a Group I metal of the Periodic System.

3. Process as claimed in claim 1 wherein said catalyst is an alkoxide of a Group III metal of the Periodic System.

4. Process as claimed in claim 1, wherein the allyl ester obtained is separated from the catalyst by distillation on completion of the reaction.

5. Process as claimed in claim 1, wherein the carboxylic acid is a saturated aliphatic or cycloaliphatic carboxylic acid.

6. Process as claimed in claim 1, wherein the carboxylic acid is a substituted aliphatic, cycloaliphatic or araliphatic, mono or polycarboxylic acid.

7. Process as claimed in claim 1, wherein the carboxylic acid is an unsaturated aliphatic, cycloaliphatic or araliphatic, mono or polycarboxyli cacid.

8. Process as claimed in claim 1, wherein the carboxylic acid is an aromatic mono or polycarboxylic acid.

9. Process as claimed in claim 1, wherein the carboxylic acid is carbonic acid.

10. Process as claimed in claim 3, wherein the aliphatic acid is an alkanoic acid.

11. Process as claimed in claim 1 wherein the catalyst is a metal alcoholate containing up to 4 carbon atoms in each alcoholate moiety.

12. Process as claimed in claim 1 wherein said metal is selected from the group consisting of lithium, sodium, potassium, aluminum and boron.

13. Process as claimed in claim 12 wherein at least two metals are present in said alcoholate.

14. Process as claimed in claim 1, in which the said catalyst is present in a quantity of 0.1 to 10 percent by weight, based on the total weight of organic starting material.

References Cited

UNITED STATES PATENTS

| | | | |
|---|---|---|---|
| 2,129,665 | 9/1938 | Barrett et al. | 260—2 |
| 2,482,606 | 9/1949 | Adelson et al. | 260—468 |
| 3,413,319 | 11/1968 | Ibbotson et al. | 260—345.8 |
| 1,860,092 | 5/1932 | Graves | 260—491 X |
| 3,255,236 | 6/1966 | Selwitz et al. | 260—475 |

FOREIGN PATENTS

| | | |
|---|---|---|
| 1,211,625 | 3/1966 | Germany. |
| 1,478,993 | 4/1967 | France. |

OTHER REFERENCES

Kirk-Ohmer, Encyclopedia of Chemical Technology, 2nd ed., Interscience Publishers, N.Y. (1963), pp. 356–57, 362 relied on.

LEWIS GOTTS, Primary Examiner

D. G. RIVERS, Assistant Examiner

U.S. Cl. X.R.

260—463, 468 R, 475 N, 476 R, 481 R, 484 R, 485 N, 486 R, 487, 491, 469